United States Patent [19]

Hall

[11] Patent Number: 4,767,150

[45] Date of Patent: Aug. 30, 1988

[54] TRAILER AND TAILGATE

[75] Inventor: Peter Hall, Asheville, N.C.

[73] Assignee: Peco, Inc., Arden, N.C.

[21] Appl. No.: 929,900

[22] Filed: Nov. 13, 1986

[51] Int. Cl.[4] ................................................ B62D 25/00
[52] U.S. Cl. ........................................ 296/50; 296/52; 296/184; 410/142
[58] Field of Search ............... 296/50, 52, 195, 183, 296/184; 49/365, 465, 463; 410/129, 140, 141, 142

[56] References Cited

U.S. PATENT DOCUMENTS

| 547,774 | 10/1895 | Edleblute | 296/52 |
| 577,834 | 3/1897 | Boettcher | 296/52 |
| 696,340 | 3/1902 | Hupfer | 296/52 |
| 1,160,821 | 11/1915 | Beane | 296/50 |
| 1,989,125 | 1/1935 | Atwell | 296/184 |
| 2,063,434 | 12/1936 | Hersey et al. | 410/142 |
| 2,972,490 | 2/1961 | Styx | 410/142 |
| 3,340,650 | 9/1967 | Sackett, Sr. | 49/463 |

FOREIGN PATENT DOCUMENTS 22896  4/1930  Netherlands .................. 296/52

Primary Examiner—James B. Marbert
Attorney, Agent, or Firm—David M. Carter

[57] ABSTRACT

There is provided an improved trailer and tailgate therefore. The means for attaching the tailgate to the remainder of the trailer is independent of the inside surfaces of the sidewalls of the trailer. Thus the sidewalls are free from obstructions permitting a free flow of material out of a trailer when it is being dumped. A pair of cane shaped rods are received through the top and bottom of the tailgate and are connected to the floor and to the tops of the sidewalls of the trailer.

1 Claim, 2 Drawing Sheets

TRAILER AND TAILGATE

BACKGROUND OF THE INVENTION

This invention relates to trailers and tailgates therefore. More particularly, it relates to trailers useful in hauling and dumping grass or other material.

In the lawn care business it is becoming more and more common for property owners to utilize small trailers to move cut grass from one location to another and to dump the grass in an appropriate place. Since cut grass is quite often wet and sticky the grass may become hung up in the inside of the trailer while the user is attempting to dump it. The smoother and more unobstructed the insides of the sidewalls are the better.

A typical prior art trailer utilize a pair of channels attached to the inside of the sidewalls extending into the inside of the trailer from near the rear opening for receiving and securing the tailgate. Since the channels protrude into the inside of the trailer at this critical location, quite often the damp grass becomes clodded as one attempts to dump the load.

Furthermore, it is sometimes difficult to remove this tailgate from the channels. The typical tailgate is simply a sheet metal structure and is easily deformed, particularly when one is hauling heavy articles such as wood or stones. A deformed tailgate is very difficult to remove and even more difficult to reinsert into the rear of the trailer.

OBJECT OF THE INVENTION

It is therefore one object of this invention to provide an improved trailer utilizing an improved tailgate.

It is another object to provide a trailer which is not proned to clod during dumping.

It is still another object to provide an improved multi-function tailgate for use with a trailer.

SUMMARY OF THE INVENTION

In accordance with one form of this invention there is provided an improved trailer having a flat bed and first and second sidewalls and a front end wall projecting upperly from the bed. The rear end of the trailer is adapted to be selectively opened and closed. A first pair of holes are received in the bed near the rear end. A tailgate is provided which is selectively received at the rear end.

The tailgate includes a pair of rods attached thereto. Each of the rods has a straight end and a non-straight end. Preferebly the rods are cane-shaped. A portion of each of the straight ends extends out of the bottom of the tailgate and are selectively received in the holes in the bed. The non-straight ends of the rods extend out of the top of the tailgate. A mechanism is provided on each of the sidewalls for receiving portions of each of the non-straight ends. Thus the tailgate may be readily held in place at the rear end of the trailer without obstructing the inside of the trailer.

Furthermore, by utilizing the pair of rods, strength is added to the tailgate as well as to the side walls of the trailer and a convenient means is provided for lifting the tailgate from the rear of the trailer by utilizing the non-straight, preferably curved, portions of the rods as handles. Preferably, the mechanism for receiving portions of the non-straight ends of the rods are holes in the tops of the sidewalls of the trailer.

In another form of applicant's invention there is provided the tailgate itself as described above.

BRIEF DESCRIPTION OF THE DRAWINGS

The subject matter which is regarded as the invention is set forth in the appended claims. The invention itself together with further advantages and objects thereof may be better seen in reference to the following description taken into conjunction with the accompanying drawings in which:

DESCRIPTION OF THE PREFERRED EMBODIMENT

Figure 1:
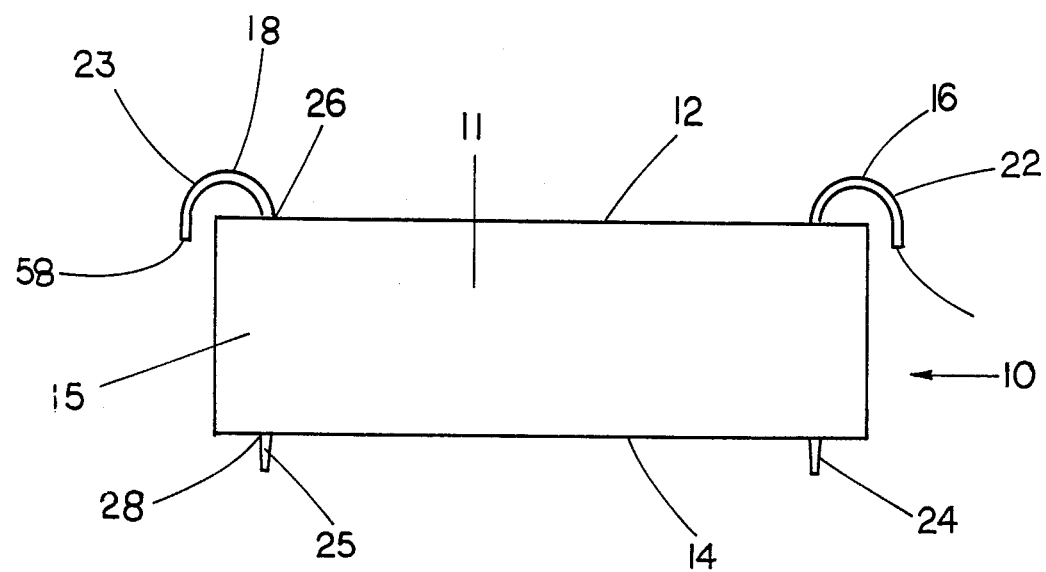
FIG. 1 is a front elevational view of the tailgate of the subject invention.
Figure 6:
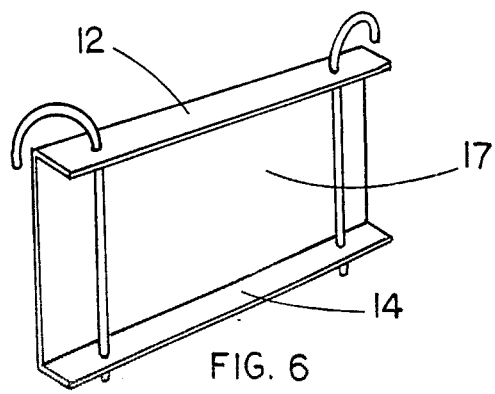
FIG. 6 is a rear perspective view of the tailgate of FIG. 1.
Figure 5:
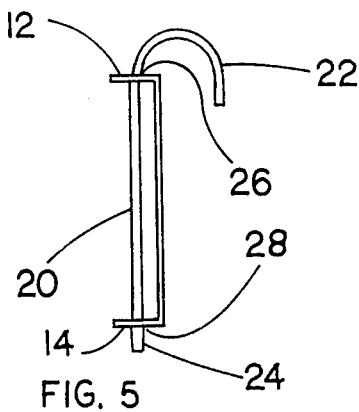
FIG. 5 is a side elevational view of the tailgate of FIG. 1.

Referring now more particularly to FIGS. 1 and 6 there is provided tailgate 10 which preferably is constructed of sheet metal forming a C-shaped structure. Tailgate 10 includes panel 11, top portion 12 and bottom portion 14 all of which are substantially flat. Panel 11 has front side 15 and rear side 17. A pair of cane shaped rods 16 and 18 pass along the rear side 17 of the tailgate and extend out of the top 12 and bottom 14 thereof. As can be seen in FIG. 5, the cane shaped rods include straight portion 20 and curved portion 22. Curved portion 22 extends out of the top 12 and end 24 of straight portion 20 extends out of bottom 14. Each of the rods are welded to the tailgate at the top and bottom at the places where they contact the top and bottom indicated by numbers 26 and 28.

Figure 2:
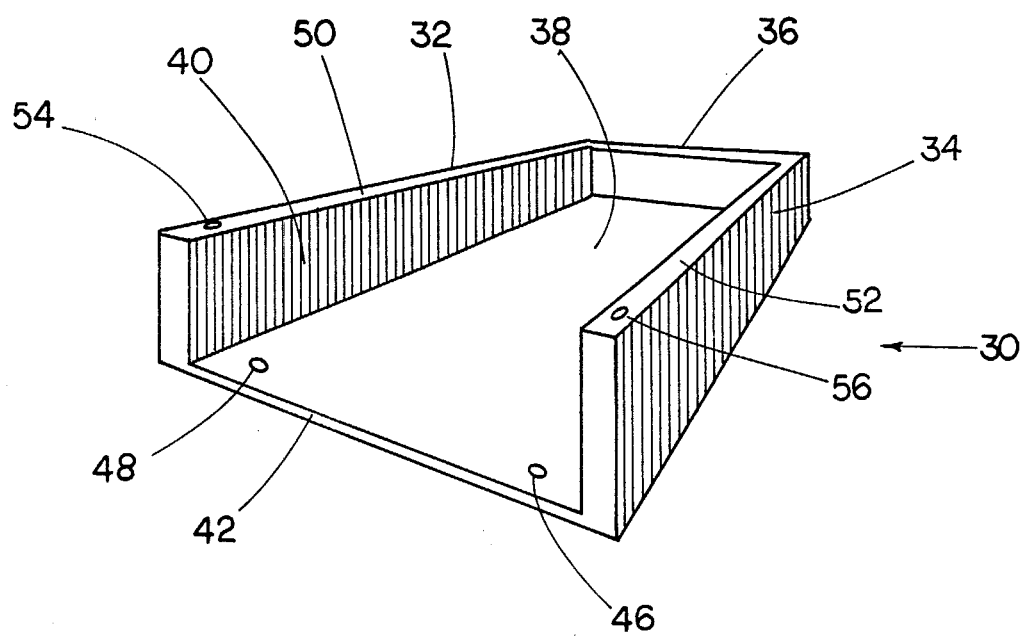
FIG. 2 is a prospective view of the trailer of the subject invention with the tailgate of FIG. 1 having been removed.

Tailgate 10 is particularly adapted to be utilized with trailer 30 which is shown in FIG. 2. Trailer 30 includes a pair of sidewalls 32 and 34 and front end wall 36, all of which are attached to bed 38. The inside surfaces 40 of both of the sidewalls are smooth so that there is nothing to inhibit or interfere with dumping materials such as wet grass from the trailer.

Figure 3:
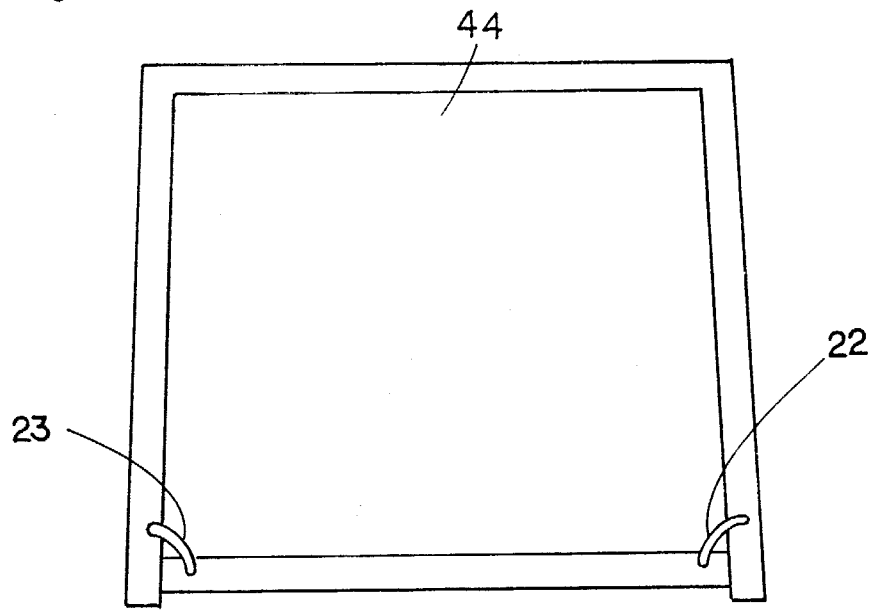
FIG. 3 is a top view of a trailer of FIG. 2 with the tailgate of FIG. 1 attached thereto.

Furthermore, as can be better seen in FIG. 3 the trailer is tapered. That is, the perpendicular distance between the sidewalls is greater at the open end 42 of the trailer than at the closed end 44. This feature also enables one to more easily dump materials out of trailer.

The open end 42 of trailer 30 is adapted to receive tailgate 10. Holes 46 and 48 are formed in the trailer bed near end 42. Studs 24 and 25 which are formed by the ends of the straight portions 20 of cane shaped rods 16 and 18 are received respectively in holes 46 and 48 when the tailgate is placed onto the rear of the trailer. The studs are somewhat tapered so that they may be readily guided into the holes 46 and 48.

Figure 4:
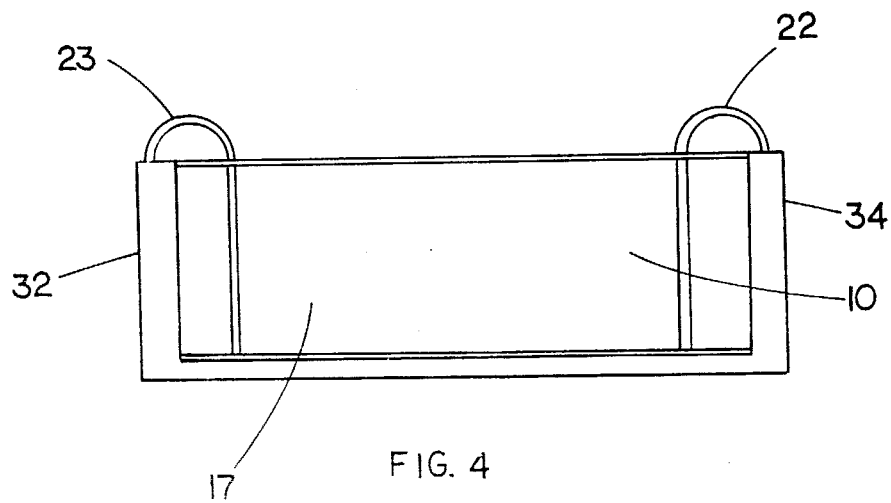
FIG. 4 is a rear elevational view of the embodiment of FIG. 3.

As can be seen in FIG. 2 each sidewall 32 and 34 includes a flat top surface 50 and 52. Holes 54 and 56 are formed in the respective tops of the sidewalls. Holes 54 and 56 are adapted to receive the ends 58 and 60 of the curved portions of the rods when the tailgate is in place at the rear of the trailer. This may be better seen in reference to FIGS. 3 and 4 where curved portions of 22 and 23 are shown having their respective ends received in holes 54 and 56. Thus, with both ends of the rods having been received in the holes in the trailer the tailgate is held firmly in place.

The unique cane shaped rods perform multiple functions when used in conjunction with the tailgate 10. Not only do these rods hold the tailgate securely in place on the end of the trailer, the rods also provide additional strength to the tailgate which is particularly important when the trailer is utilized to carry heavy materials, such as rocks or logs. Also the rods and tailgate aid in keeping the sidewalls from bowing when the tailgate is attached to the trailer With the prior art tailgates it was quite often very difficult to remove the tailgate from the trailer. An additional function which the cane shaped rods provide is ease of removal of the gate from the trailer. The top portions are curved forming handles so that the user may simply pull upwardly on the handles and, since the rods are securely welded to the remainder of the tailgate, the tailgate may be readily removed from the rest of the trailer.

From the foregoing description of the preferred embodiment it will be apparent that many modifications may be made therein without departing from the true spirit and scope of the invention.

I claim:

1. An improved trailer comprising:

a flat bed;

first and second side walls and a front wall projecting upwardly from said bed;

the rear end of said trailer adapted to be selectively opened and closed;

a first pair of holes received in said bed near said rear end;

a tailgate; said tailgate selectively received near said rear end;

said rear end being substantially free from obstructions when said tailgate is not in place at said rear end;

said tailgate being formed with a substantially C-shaped cross-section having a substantially flat panel and top and bottom members extending from said panel;

a pair of cane-shaped rods located alongside said panel; said rods each having a straight end and a curved end; a portion of said straight end of each rod extending out of said bottom member; said portions of said straight ends received in said first pair of holes; said curved ends extending out of said top member; a second pair of holes in the tops of said side walls near the rear end of said trailer; portions of said curved ends received in said second pair of holes in said trailer; said cane-shaped rods firmly connected to said tailgate wherein said rods (i) enable attachment of said tailgate to the remainder of said trailer to (ii) act as handles for enabling the removal of said tailgate from the remainder of said trailer, (iii) providing strength for said tailgate and (iiii) adding strength to said side walls;

the inside surfaces of said side walls being substantially smooth making said trailer more readily unloadable; said rear end of said trailer being wider than said front end of said trailer whereby said trailer is tapered thereby making said trailer further more readily unloadable.

* * * * *